United States Patent [19]
Mizutani et al.

[11] Patent Number: 5,677,738
[45] Date of Patent: Oct. 14, 1997

[54] VIDEO SIGNAL CONVERTER

[75] Inventors: Yosuke Mizutani, Hashima; Seiya Ota, Ama-gun, both of Japan

[73] Assignee: Sanyo Electric Co., Ltd., Moriguchi City, Japan

[21] Appl. No.: 757,902

[22] Filed: Nov. 27, 1996

Related U.S. Application Data

[63] Continuation of Ser. No. 510,506, Aug. 2, 1995, abandoned.

[30] Foreign Application Priority Data

Aug. 4, 1994 [JP] Japan .................... 6-202763

[51] Int. Cl.⁶ .................................. H04N 7/01
[52] U.S. Cl. ......................... 348/458; 348/445
[58] Field of Search .................. 348/458, 459, 348/455, 441, 448, 443; H04N 7/01

[56] References Cited

U.S. PATENT DOCUMENTS

| | | | |
|---|---|---|---|
| 4,872,054 | 10/1989 | Gray et al. | 348/441 |
| 5,070,395 | 12/1991 | Kitaura et al. | 348/458 |
| 5,363,140 | 11/1994 | Isomoto et al. | 348/458 |
| 5,410,357 | 4/1995 | Rieger et al. | 348/458 |

*Primary Examiner*—Victor R. Kostak
*Attorney, Agent, or Firm*—Armstrong, Westerman, Hattori, McLeland & Naughton

[57] ABSTRACT

A video signal converter comprising a frequency setting circuit, a first clock generator, a second clock generator, an analog-to-digital converter, a line conversion ratio setting circuit, a number of scanning lines converter, a frame memory, a writing controller, a reading controller and a digital-to-analog converter is disclosed. The frequency setting circuit sets a first frequency Fi which satisfies a formula: $Fi \leq (To \times Fo)/Ti$, where Ti is a horizontal scanning period of a first analog video signal, To is a horizontal scanning period of a second analog video signal and Fo is a second frequency. The line conversion ratio setting circuit sets a line conversion ratio R which satisfies an equation: $R=m/k$, based on a width-to-height ratio 1/m of each pixel of the first digital video data and a width-to-height ratio 1/k of each pixel of second digital video data. The number of scanning lines converter converts any digital video data having a first number of scanning lines to varied digital video data having a second number of scanning lines, the second number of scanning lines being R-times the first number of scanning lines. The writing controller memorizes the first digital video data into the memory in synchronization with the first clock of the first frequency Fi. The reading controller reads the first digital video data from the memory in synchronization with the second clock of the second frequency Fo to generate the second digital video data.

18 Claims, 3 Drawing Sheets

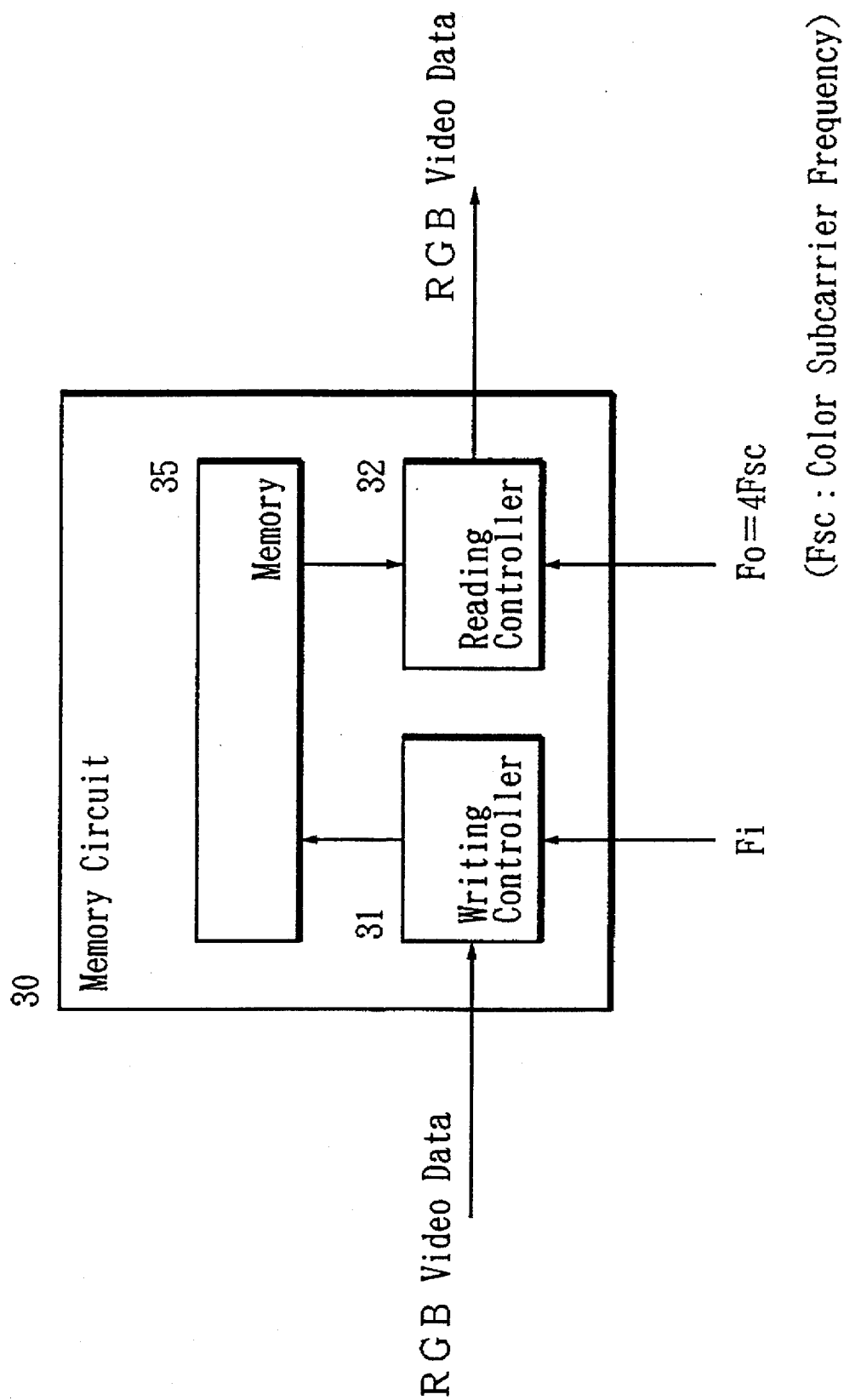

VIDEO SIGNAL CONVERTER

This application is a continuation of application Ser. No. 08/510,506 filed Aug. 2, 1995, now abandoned.

BACKGROUND OF THE INVENTION

1. Field of the Invention

The present invention generally relates to a video signal converter. A video signal converter of the present invention converts a video signal of any format (e.g., RGB, YIQ, NTSC, PAL, SECAM and MUSE) to a video signal of other format.

2. Description of the Related Art

Conventionally, a HDTV-NTSC converter has been provided, into which a video signal of a MUSE format is inputted and from which a video signal of an NTSC format is outputted. This outputted video signal of an NTSC format is a composite signal or Y/C separated signals. Incidentally, a MUSE (Multiple Sub-Sampling Encode) format is one of the HDTV formats.

The MUSE-NTSC converter receives an analog video signal of a MUSE format. Firstly, the analog video signal of a MUSE format is converted to a digital video data according to a sampling clock of the MUSE system frequency (16.2 MHz). Secondly, the digital video data is written into a memory in synchronization with the above sampling clock of the MUSE system frequency. Thirdly, the digital video data is read from the above memory in synchronization with a clock of an NTSC system frequency (14.3 MHz=NTSC color sub-carrier frequency fsc×4) to be converted a data rate. Fourthly, the digital video data is provided a vertical filter processing to be converted the number of scanning lines (aspect ratio). Fifthly, the digital video data is converted to an analog video signal. Finally, the analog video signal is inputed into an NTSC encoder to be converted to a video signal of an NTSC format (a composite signal or Y/C separated signals) and is outputed the same. It should be noted here that there has been another type of a MUSE-NTSC converter which converts the aspect ratio (number of scanning lines) before the data rate conversion.

SUMMARY OF THE INVENTION

There are various formats for video signal which is outputted from a personal computer (PC), such as SVGA (1024×768 pixels) format and VGA (640×480 pixels) format. There is a demand that a video signal of any format should be displayed on an NTSC-TV screen, and there is also a demand that a video signal of a MUSE format should be displayed on an NTSC-TV screen.

There is a further demand that there should be no missing in the peripheral part of an image obtained by the above conversion (e.g., conversion from the SVGA standard to the NTSC format).

The width-to-height ratio (pixel ratio) of each pixel is different between the PC screen of SVGA format or other and the TV screen of NTSC format. That is, as the width-to-height ratio of each pixel (picture element) of the screen of the PC is 1:1, while the width-to-height ratio of each pixel of the TV screen of NTSC format is 1:k. Accordingly, if each PC video signal of the above-described formats is converted to the video signal of an NTSC format without converting the width-to-height ratio, there will be a trouble that the converted image is long in the height direction. Therefore, there is also a demand that such trouble should be prevented and the image after conversion should be displayed with the normal aspect ratio.

In view of the above, the present invention has an object to satisfy each of the above demands.

To achieve the above object, a video signal converter of the present invention has the following elements (a) through (h):

(a) An analog-to-digital converter which converts an input analog video signal (=a first analog video signal) to digital video data (=first digital video data) according to a sampling clock of a first frequency Fi.

b) a frame memory.

(c) A writing controller which stores the first digital video data into the frame memory in synchronization with the sampling clock of the first frequency Fi.

(d) A reading controller which reads the first digital video data from the frame memory in synchronization with a second clock of a second frequency Fo to generate second digital video data.

(e) A digital-to-analog converter which converts the second digital video data to a second analog video signal (=output signal) in synchronization with the second clock of the second frequency Fo.

(f) A frequency setting circuit which sets the first frequency Fi. This first frequency Fi satisfies a formula:

$$Fi \leq (To \times Fo)/Ti,$$

where Ti is a horizontal scanning period of the first analog video signal, To is a horizontal scanning period of the second analog video signal and Fo is a second frequency.

(g) A first clock generator which generates the first clock of the first frequency Fi set by the frequency setting circuit.

(h) A second clock generator which generates the second clock of the second frequency Fo.

It is acceptable that an NTSC encoder is provided before the digital-to-analog converter (e). In this case, the second digital video data is converted to digital video data of NTSC format (composite data or Y/C separated data) by the NTSC encoder. When the NTSC encoder is provided before the digital-to-analog converter (e), the second frequency Fo which is four times the frequency of the color subcarrier frequency Fsc (3.58 MHz) of NTSC format is employed.

It is also acceptable that the NTSC encoder is provided after the digital-to-analog converter (e). In this ease, the second analog video signal is converted to an analog video signal of NTSC format (composite signal or Y/C separated signals) by the NTSC encoder. When the NTSC encoder is provided after the digital-to-analog converter (e), any frequency is employed as the second frequency Fo.

The first analog video signal are RGB signals when the input is made from the PC. When a video signal of HDTV format is inputted as the first video signal, the signal is comprised of RGB signals or $YP_B P_R$ signals.

Furthermore a video signal converter of the present invention has the following elements (j) through (m):

(j) An analog-to-digital converter which converts an input analog video signal (=a first analog video signal) to digital video data (=first digital video data).

(k) A scanning line converter which converts any digital video data having a first number of scanning lines to varied digital video data having a second number of scanning lines. This second number of scanning lines is R-times the first number of scanning lines.

(l) A line conversion ratio setting circuit which sets the line conversion ratio R. This line conversion ratio R satisfies an equation:

$$R = m/k,$$

based on a width-to-height ratio 1/m of each pixel of the first digital video data and a width-to-height ratio 1/k of each pixel of the second digital video data.

(m) A digital-to-analog converter which converts the second digital video data to a second analog video signal (=output signal).

For example, when the first analog video signal is comprised of RGB signals and the RGB signals are sent from the PC, the width-to-height ratio of each pixel of the first digital video data is 1:1. And when the second analog video signal is a signal Of NTSC format, the width-to-height ratio of each pixel of the second digital video data is 1:k. Therefore, the conversion ratio R in this case is 1/k.

When the first analog video signal is a video signal of HDTV format, the width-to-height ratio of each pixel of the first digital video data is 1:m. And when the second analog video signal is a signal of NTSC format, the width-to-height ratio of each pixel of the second digital video data is 1:k. Therefore, the conversion ratio R in this case is m/k.

Moreover, a video signal converter of the present invention is comprised of the said elements (a), (b), (c), (d), (e), (f), (g), (h), (k) and (l).

In the video signal converter according to the present invention, the first analog video signal is analog-to-digital converted according to the sampling clock (=first clock) of the first frequency Fi, then stored in the frame memory in synchronization with the first clock, then read from the frame memory in synchronization with the second clock of the second frequency Fo, and then digital-to-analog converted in synchronization with the second clock of the second frequency Fo.

Furthermore, before the writing the first digital video data into the frame memory, the first digital video data having a first number of scanning lines is converted to varied first digital video data having a second number of scanning lines. The second number of scanning lines is R-times the first number of scanning lines. Or after reading the first digital video data to generate the second digital video data from the frame memory, the second digital video data having a first number of scanning lines is converted to varied second digital video data having a second number of scanning lines. The second number of scanning lines is R-times the first number of scanning lines.

BRIEF DESCRIPTION OF THE DRAWINGS

FIG. 3 is a block diagram illustrating the memory circuit 30 of FIG. 1.

DETAILED DESCRIPTION OF THE PREFERRED EMBODIMENT

Figure 1:
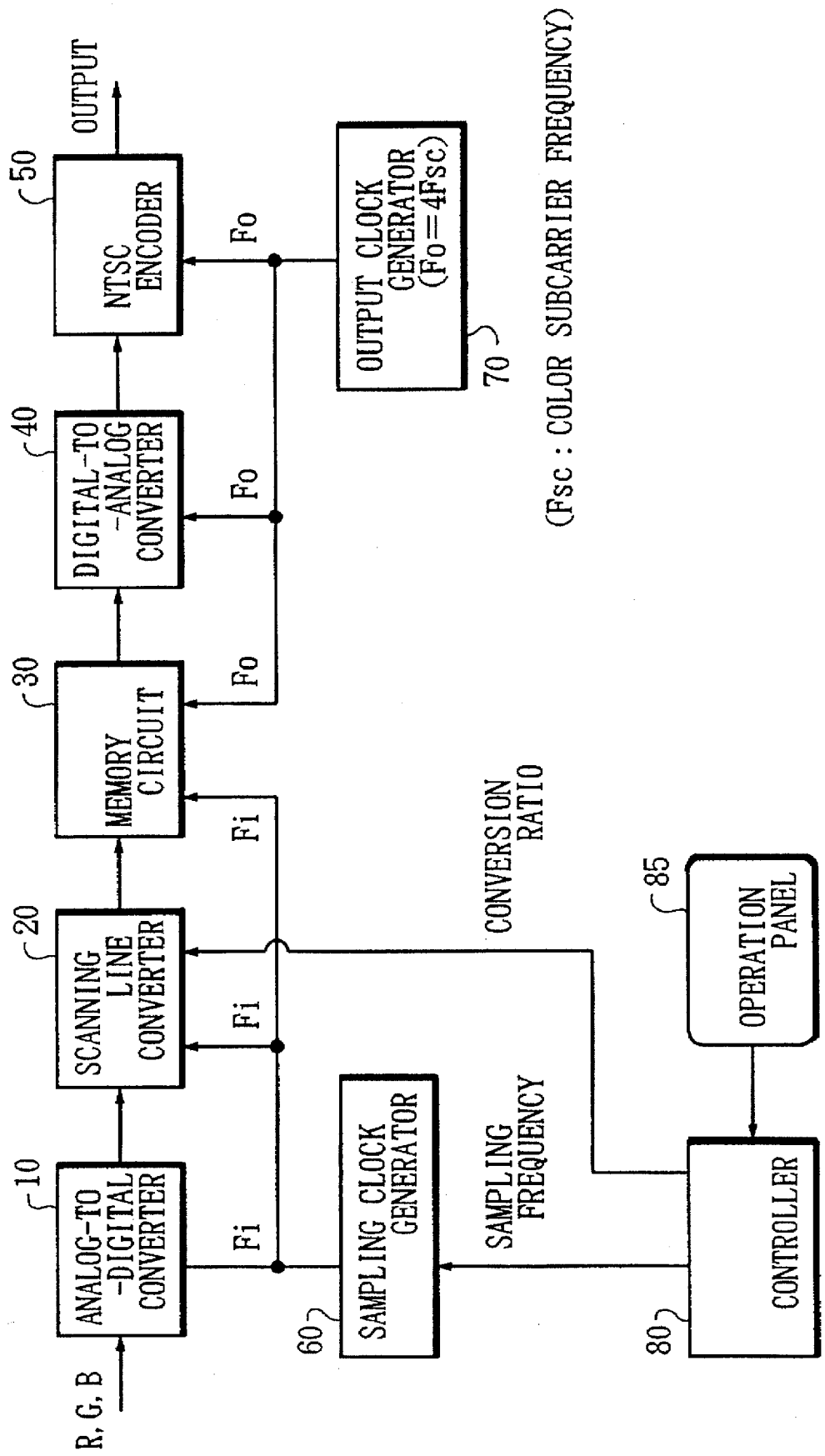
FIG. 1 is a block diagram illustrating the circuit configuration of a video signal converter according to an embodiment of the present invention.

Now, an embodiment of the present invention will be described referring to the appended drawings.

According to the embodiment illustrated in the drawings, analog RGB signals outputted from a PC are converted to an analog video signal of NTSC format.

As illustrated in the drawings, a video signal converter of this embodiment includes an analog-to-digital converter 10, a scanning line converter 20 provided after the analog-to-digital converter 10, a memory circuit 30 provided after the scanning line converter 20, a digital-to-analog converter 40 provided after the memory circuit 30, and an NTSC encoder 50 provided after the digital-to-analog converter 40. The video signal converter of the present invention further includes a sampling clock generator 60 which generates the first clock of the first frequency Fi and supplies the same to the analog-to-digital converter 10, the scanning line converter 20 and the memory circuit 30, and an output clock generator 70 which generates the second clock of the second frequency Fo and supplies the same to the memory circuit 30, the digital-to-analog converter 40 and the NTSC encoder 50. The video signal converter of the present invention still further includes a controller 80 which sets the first frequency Fi to the sampling clock generator 60 and sets the conversion ratio R to the scanning line converter 20.

The analog-to-digital converter 10 converts an incoming analog video signal (=the first analog video signal=in this case, RGB video signals) to digital video data (=the first digital video data=in this case, RGB video data), respectively.

The scanning line converter 20 converts incoming digital video data (=in this case, the first digital video data=RGB video data) having the first number of scanning lines to varied digital video data (=in this case, varied first digital video data=varied RGB video data) having the second number of scanning lines. The conversion ratio R (=(the second number of scanning linesis)/(the first number of scanning lines)) is set by the controller 80.

In the memory circuit 30, the incoming digital video data (=varied first digital video data=in this case, varied RGB video data) from the scanning line converter 20 is memorized into the frame memory 35 (shown in FIG. 3) in synchronization with the first clock of the first frequency Fi. And in the memory circuit 30, the digital video data (=varied first digital video data=in this case, varied RGB video data) memorized in the frame memory 35 is read therefrom in synchronization with the second clock of the second frequency Fo to generate the second digital video data (=in this case, second RGB video data). As a result, the data rate is varied. The second clock of the second frequency Fo is given by the output clock generator 70.

The digital-to-analog converter 40 converts the second digital video data outputted from the memory circuit 30 to the second analog video signals (=in this case, second RGB video signals).

The NTSC encoder 50 encodes the second analog video signals (=in this case, second RGB video signals) outputted from the digital-to-analog converter 40 to an analog video signal of NTSC format (a composite signal or Y/C separated signals).

In the video signal converter illustrated in the drawings, the NTSC encoder 50 is provided after the digital-to-analog converter 40. It may be so constructed, however, that an NTSC encoder 50 is provided before the digital-to-analog converter 40.

The first frequency Fi is selected from among the frequencies available in a ROM table which is provided in the controller 80. This selection is performed by the controller 80 based on a state inputted through an operation panel 85. The first frequency Fi thus selected is given to the sampling clock generator 60.

In other words, a group of frequencies are provided in the ROM table. The each frequency is corresponding to any one of the numbers of pixels in a horizontal line (=the number of samples during the horizontal scanning period) of video signals, respectively. The video signals have the already-existing format, such as SVGA format (1024×768 pixels) and VGA format (640×480 pixels) of the PC. From among the group of frequencies available in the ROM table is selected the maximum value which satisfies a formula:

$$Fi \leq (To \times Fo)/Ti,$$

and is given to the sampling clock generator 60. Here, Ti is the horizontal scanning period of the first analog video signal which is input to the video signal converter of the present invention, and To is the horizontal scanning period of the second analog video signal which is output from the video signal converter of the present invention. Furthermore, the above horizontal scanning period is defined as a period which is made by subtracting the horizontal blanking period from the horizontal period 1H.

On the other hand, the second clock of the second frequency Fo given from the output clock generator 70 is determined by a format of the second analog video signal to be generated from the video signal converter of the present invention. In the video signal converter of the present embodiment, a value of the second frequency Fo is four times as much as the color subcarrier frequency Fsc (=3.579545 MHz) of the NTSC signal. However, in the present embodiment, the second frequency Fo is not limited the size of four times the color subcarrier frequency Fsc. Any integral number of multiples of the Fsc may be employed. This limitation of the integral numbers of multiples of the Fsc is applicable only to a case where the NTSC encoder 50 is provided before the digital-to-analog converter 40. Therefore, when an NTSC encoder is provided after the digital-to-analog converter 40, there is no special limitation on the second frequency Fo.

The width-to-height ratio of each pixel of the first digital video data is "1:m," and the width-to-height ratio of each pixel of the second digital video data is "1:k." When specific data of the width-to-height ratios are given to the controller 80 through the operation panel 85, the controller 80 sets the conversion ratio R (=m/k) to the scanning line converter 20. With respect to the input to the operation panel 85, in addition to the direct input of each of the width-to-height ratios through the keyboard or the like, there is a case where information of digital video data of SVGA format is input into the video signal converter of the present invention and of an analog video signal of NTSC format is to generate from the video signal converter of the present invention. In this case, the controller 80 works out the conversion ratio R (=m/k) based on the information. In other words, The ROM table which specifies each width-to-height ratios in correspondence to the above information is made ready, and this ROM table is searched for the desired width-to-height ratios to generate the above conversion ratio R (=m/k).

Next, signal processing flow will be described with respect to a case where the PC video data of SVGA format (1024×768 pixels; non-interlace) is converted to the video signal of the NTSC format (764×468 pixels; interlace).

Firstly, when information the effect that the input video data is the SVGA format of PC is input to the controller 80 through the operation panel 85, the above first frequency Fi and the above conversion ratio R (=m/k) are obtained by the controller 80.

Specifically, the maximum value which satisfies a formura:

$Fi \leq (To \times Fo)/Ti$, is selected as the first frequency Fi from among the ROM table (not illustrated).

Furthermore, the width-to-height ratio of each pixel of the first video data (=input video data) of SVGA format is 1:1 and the width-to-height ratio of each pixel of the second video data (=output video data) of NTSC format is 1:k. Therefore, conversion ratio R is determined as 1/k. Here, k varies according to the type of the output destination to which the second analog video signal (an output video signal) is sent. The hardware on the output side is the TV of NTSC format in this embodiment. In other words, the hardware of the destination to which the second analog video signal (output video signal) is sent is the TV of NTSC format in this embodiment.

When the analog RGB (red, green and blue) video signals of SVGA format which correspond to 1024 samples in the horizontal direction are input into the video signal converter of the present invention, the respective first analog video signal of RGB are converted to the first digital video data of RGB through the analog-to-digital converter 10 by the sampling clock of the above first frequency Fi respectively. And then the respective first digital video data of RGB having a first number of scanning lines are converted to varied digital video data of RGB having a second number of scanning lines through the scanning line converter 20 respectively. Thus the number of scanning lines is converted to 1/k.

Figure 2:
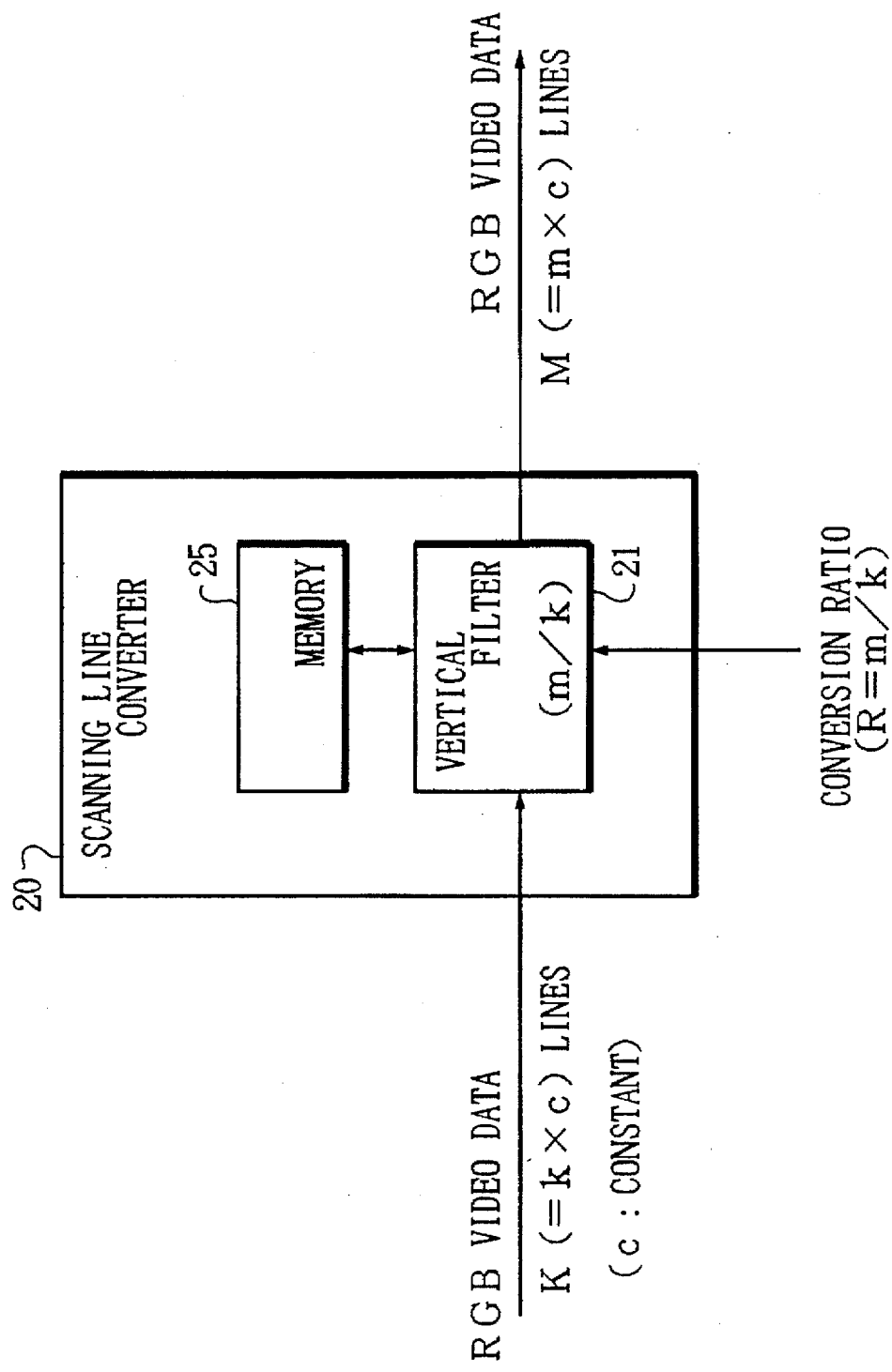
FIG. 2 is a block diagram illustrating the scanning line converter 20 of FIG. 1.

A vertical filter 21 of the scanning line converter 20 illustrated in FIG. 2 controls each weight given to each filter factor of each tap according to the above conversion ratio R so that each weight can be switched according to field to prevent pairing and achieve a good interlace scanning.

Each digital video data of R, G and B with the number of scanning lines thereof converted by the scanning line converter 20 is stored by a writing controller 31 illustrated in FIG. 3 to a specified address of a frame memory 35 in synchronization with the first clock of the first frequency Fi. The address to be written is determined in consideration of the conversion of non-interlace scanning to interlace scanning.

Each digital video data of R, G and B written to the frame memory 35 is then read by a reading controller 32 in synchronization with the second clock of the second frequency Fo. By setting the first clock for writing to the first frequency Fi and the second clock for reading to the second frequency Fo in this way, the conversion of 1024 samples of SGVA format to 764 (or less) samples of NTSC TV format is performed.

Each digital video data of R, G and B read from the frame memory 35 by the reading controller 32 is then sent to the digital-to-analog converter 40 and converted to each analog video signal (=second analog signal) of R, G and B. Then, each analog video signal of R, G and B is input into the NTSC encoder 50 and converted to a TV signal of NTSC format, and output to the outside of the video signal converter of the present invention. In this case, the second analog signal (output signal) may be composite signal or Y/C separated signals.

In the above embodiment, description is given to a care where the video signal of the SVGA format of the PC inputs to the video signal converter of the present invention and the video signal of the NTSC format outputs from the video signal converter of the present invention. However, the present invention is not limited to such case. For example, it may be so constructed that the video signal of the VGA format of PC, the video signal of HDTV format, the video signal of the other format of PC, the video signal of PAL format or the video signal of SECAM format inputs to a video signal converter of the present invention and converts to video signal of any other format. In such case, when the number of samples in the horizontal direction of the first analog vide signal to be input into the video signal converter of the present invention is smaller than the number of samples in the horizontal direction of the second analog signal to be output from the video signal converter of the present invention, the above-described horizontal process is not made. Furthermore, if non-image part is generated at the peripheral part of the image by the conversion without any missing of the peripheral part of the image according to the present invention, a specified color is provided to the non-image part by the well-known BGV circuit.

In the above description, as process systems for the scanning line converter 20 and memory circuit 30, the respective processes for R, G and B video data are used. Of course, however, it is possible to use process systems for Y-C (luminance signal and color difference signal) signals to reduce the number of circuits.

As described above, according to the present invention, the first video data analog-to-digital converted by the sampling clock of the first frequency Fi which satisfies a formula $$Fi \leq (To \times Fo)/Ti,$$

is written to the frame memory in synchronization with the first clock of the first frequency Fi and then read from the frame memory in synchronization with the second clock of the second frequency Fo and digital-to-analog converted. Therefore, even if the number of pixels in the horizontal direction of the input image is large, the input image can be converted to an image of a desired format with no missing at both sides of the image.

Furthermore, according to the present invention, the number of scanning lines is converted at the conversion rate of m/k. Therefore, even if the width-to-height ratio of each pixel of the first video signal (input video signal) is different from the width-to-height ratio of each pixel of the second video signal (output video signal), the input video signal can be converted to a video signal of a desired format with no distortion of the aspect ratio of the image.

We claim:

1. A video signal converter comprising:
   a ROM table having frequencies, each of the frequencies being associated with already-existing formats of video signals;
   an operation panel;
   selecting means for selecting a first frequency Fi from the ROM table based on a format of a first video signal input through the operation panel, the first frequency Fi having the maximum value which satisfies a formula: $Fi \leq (To \times Fo)/Ti$, where the Ti is a horizontal scanning period of the first video signal, the To is a horizontal scanning period of a second video signal, and the Fo is a second frequency;
   first clock generating means for generating a first clock of the first frequency Fi;
   second clock generating means for generating a second clock of the second frequency Fo;
   analog-to-digital converting means for converting the first analog video signal to first digital video data according to a sampling clock of the first frequency Fi;
   writing means for writing the first digital video data into a memory in synchronization with the first clock;
   reading means for reading the first digital video data from the memory in synchronization with the second clock to generate second digital video data; and
   digital-to-analog converting means for converting the second digital video data to a second analog video signal in synchronization with the second clock.

2. A video signal converter comprising:
   a ROM table having frequencies, each of the frequencies being associated with already-existing formats of video signals;
   an operation panel;
   selecting means for selecting a first frequency Fi from the ROM table based on a format of a first video signal input through the operation panel, the first frequency Fi having the maximum value which satisfies a formula: $Fi \leq (To \times Fo)/Ti$, where the Ti is a horizontal scanning period of the first video signal, the To is a horizontal scanning period of a second video signal, and the Fo is a second frequency;
   first clock generating means for generating a first clock of the first frequency Fi;
   second clock generating means for generating a second clock of the second frequency Fo;
   analog-to-digital converting means for converting the first analog video signal to first digital video data according to a sampling clock of the first frequency Fi;
   writing means for writing the first digital video data into a memory in synchronization with the first clock;
   reading means for reading the first digital video data from the memory in synchronization with the second clock to generate second digital video data;
   an NTSC encoder for encoding the second digital video data to generate video data of the NTSC format; and
   digital-to-analog converting means for converting the NTSC video data to an NTSC analog video signal in synchronization with the second clock.

3. A video signal converter according to claim 2, wherein said first analog video signal is comprised of RGB signals.

4. A video signal converter according to claim 2, wherein said first analog video signal is a signal of HDTV format.

5. A video signal converter according to claim 2, wherein said second frequency Fo satisfies an equation: $Fo=4 \times Fsc$, where Fsc is a color subcarrier frequency of the NTSC format.

6. A video signal converter according to claim 3, wherein said second frequency Fo satisfies an equation: $Fo=4 \times Fsc$, where Fsc is a color subcarrier frequency of the NTSC format.

7. A video signal converter according to claim 4, wherein said second frequency Fo satisfies an equation: $Fo=4 \times Fsc$, where Fsc is a color subcarrier frequency of the NTSC format.

8. A video signal converter comprising:
   analog-to-digital converting means for converting a first analog video signal to first digital video data;
   a ROM table having width-to-height ratios of pixels, each of the ratios being associated with already-existing formats of video signals;
   an operation panel;
   line conversion ratio setting means for setting a line conversion ratio R which satisfies an equation: $R=m/k$, where the 1/m is a width-to-height ratio read from the ROM table based on a format of the first video signal input through the operation panel, the 1/k is a width-to-height ratio of a second video data;
   converting means for converting the first digital video data having a first number of scanning lines to the second digital video data having a second number of scanning lines, the second number being R-times the first number; and
   digital-to-analog converting means for converting the second digital video data to a second analog video signal.

9. A video signal converter comprising:
   analog-to-digital converting means for converting a first analog video signal to first digital video data;
   a ROM table having width-to-height ratios of pixels, each of the ratios being associated with already-existing formats of video signals;
   an operation panel;
   line conversion ratio setting means for setting a line conversion ratio R which satisfies an equation: $R=m/k$, where the 1/m is a width-to-height ratio read from the ROM table based on a format of the first video signal input through the operation panel, the 1/k is a width-to-height ratio of a second video data;

converting means for converting the first digital video data having a first number of scanning lines to the second digital video data having a second number of scanning lines, the second number being R-times the first number;

an NTSC encoder for encoding the second digital video data to generate video data of the NTSC format; and digital-to-analog converting means for converting the video data of the NTSC format to an analog video signal of the NTSC format.

10. A video signal converter according to claim 9, wherein said first analog video signal is comprised of RGB signals, each of the RGB signals having a width-to-height ratio 1/1 of each pixel, respectively.

11. A video signal converter according to claim 9, wherein said first analog video signal is a signal of HDTV format.

12. A video signal converter comprising:

a ROM table having frequencies and width-to-height ratios of pixels, each of the frequencies and each of the ratios being associated with already-existing formats of video signals;

an operation panel;

selecting means for selecting a first frequency Fi from the ROM table based on a format of a first video signal input through the operation panel, the first frequency Fi having the maximum value which satisfies a formula: $Fi \leq (To \times Fo)/Ti$, where the Ti is a horizontal scanning period of the first video signal, the To is a horizontal scanning period of a second video signal, and the Fo is a second frequency;

first clock generating means for generating a first clock of the first frequency Fi; second clock generating means for generating a second clock of the second frequency Fo;

analog-to-digital converting means for converting the first analog video signal to first digital video data according to a sampling clock of the first frequency Fi;

line conversion ratio setting means for setting a line conversion ratio R which satisfies an equation: $R=m/k$, where the 1/m is width-to-height ratio read from the ROM table based on a format of the first video signal input through the operation panel, the 1/k is a width-to-height ratio of a second video data;

converting means for converting the first digital video data having a first number of scanning lines to the second digital video data having a second number of scanning lines, the second number being R-times the first number;

a frame memory writing means for writing the first digital video data into the frame memory in synchronization with the first clock;

reading means for reading the first digital video data from the frame memory in synchronization with the second clock to generate the second digital video data; and digital-to-analog conversion means for converting the second digital video data to the second analog video signal in synchronization with the second clock.

13. A video signal converter comprising:

a ROM table having frequencies and width-to-height ratios of pixels, each of the frequencies and each of the ratios being associated with already-existing formats of video signals;

an operation panel;

selecting means for selecting a first frequency Fi from the ROM table based on a format of a first video signal input through the operation panel, the first frequency Fi having the maximum value which satisfies a formula: $Fi \leq (To \times Fo)/Ti$, where the Ti is a horizontal scanning period of the first video signal, the To is a horizontal scanning period of a second Video signal, and the Fo is a second frequency;

first clock generating means for generating a first clock of the first frequency Fi;

second clock generating means for generating a second clock of the second frequency Fo;

analog-to-digital converting means for converting the first analog video signal to first digital video data according to a sampling clock of the first frequency Fi;

line conversion ratio setting means for setting a line conversion ratio R which satisfies an equation: $R=m/k$, where the 1/m is width-to-height ratio read from the ROM table based on a format of the first video signal input through the operation panel, the 1/k is a width-to-height ratio of a second video data;

converting means for converting the first digital video data having a first number of scanning lines to the second digital video data having a second number of scanning lines, the second number being R-times the first number;

a frame memory writing means for writing the first digital video data into the frame memory in synchronization with the first clock;

reading means for reading the first digital video data from the frame memory in synchronization with the second clock to generate the second digital video data; and an NTSC encoder for encoding the second digital video data to generate video data of the NTSC format; and digital-to-analog converting means for converting the video data of the NTSC format to an analog video signal of the NTSC format.

14. A video signal converter according to claim 13, wherein said first analog video signal is comprised of RGB signals, each of the RGB signals having a width-to-height ratio 1/1 of each pixel, respectively.

15. A video signal converter according to claim 13, wherein said first analog video signal is a signal of HDTV format.

16. A video signal converter according to claim 13, wherein said second frequency Fo satisfies an equation: $Fo = 4 \times Fsc$, where Fsc is a color subcarrier frequency of the NTSC format.

17. A video signal converter according to claim 14, wherein said second frequency Fo satisfies an equation: $Fo = 4 \times Fsc$, where Fsc is a color subcarrier frequency of the NTSC format.

18. A video signal converter according to claim 15, wherein said second frequency Fo satisfies an equation: $Fo = 4 \times Fsc$, where Fsc is a color subcarrier frequency of the NTSC format.

* * * * *